United States Patent
Alexander et al.

(10) Patent No.: US 11,175,923 B2
(45) Date of Patent: Nov. 16, 2021

(54) COMPARING LOAD INSTRUCTION ADDRESS FIELDS TO STORE INSTRUCTION ADDRESS FIELDS IN A TABLE TO DELAY ISSUING DEPENDENT LOAD INSTRUCTIONS

(71) Applicant: INTERNATIONAL BUSINESS MACHINES CORPORATION, Armonk, NY (US)

(72) Inventors: Gregory W. Alexander, Pflugerville, TX (US); James J. Bonanno, Wappingers Falls, NY (US); Adam B. Collura, Hopewell Junction, NY (US); Bruce C. Giamei, Lagrangeville, NY (US); Christian Jacobi, West Park, NY (US); Jang-Soo Lee, Poughkeepsie, NY (US); Edward T. Malley, New Rochelle, NY (US); Lawrence J. Powell, Jr., Round Rock, TX (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

(21) Appl. No.: 15/431,240

(22) Filed: Feb. 13, 2017

(65) Prior Publication Data
US 2018/0232234 A1    Aug. 16, 2018

(51) Int. Cl.
G06F 9/38    (2018.01)

(52) U.S. Cl.
CPC .......... *G06F 9/3838* (2013.01); *G06F 9/3834* (2013.01)

(58) Field of Classification Search
CPC ..................................................... G06F 9/3838
See application file for complete search history.

(56) References Cited

U.S. PATENT DOCUMENTS

| 5,488,730 | A   |   | 1/1996  | Brown, III et al. |
|-----------|-----|---|---------|-------------------|
| 6,385,715 | B1  | * | 5/2002  | Merchant ................ G06F 9/383 712/218 |
| 6,665,792 | B1  | * | 12/2003 | Merchant ................ G06F 9/383 712/219 |
| 7,200,737 | B1  | * | 4/2007  | Merchant ................ G06F 9/383 712/218 |

(Continued)

FOREIGN PATENT DOCUMENTS

WO    2013095661 A1    6/2013

*Primary Examiner* — Jacob Petranek
(74) *Attorney, Agent, or Firm* — Cantor Colburn LLP; Margaret McNamara (57) ABSTRACT

A computer-implemented method for marking load and store instruction overlap in a processor pipeline is described. The method includes detecting a load instruction following a store instruction in an instruction stream. The load instruction and the store instruction include instruction text. The instruction text includes operand address information. The method includes comparing operand address information of the store instruction with operand address information of the load instruction to determine whether there is a memory image overlap in an issue queue between the operand address information of the store instruction and the load instruction. The method also includes delaying the load instruction in the processor pipeline in response to determining that there is a memory image overlap.

4 Claims, 9 Drawing Sheets

(56) References Cited

U.S. PATENT DOCUMENTS

| | | | | |
|---|---|---|---|---|
| 7,975,130 | B2 | 7/2011 | Alexander et al. | |
| 8,918,625 | B1* | 12/2014 | O'Bleness | G06F 9/3834 |
| | | | | 712/214 |
| 8,930,679 | B2 | 1/2015 | Day et al. | |
| 9,524,165 | B1* | 12/2016 | Hutton | G06F 9/3838 |
| 2004/0044881 | A1* | 3/2004 | Maier | G06F 9/3824 |
| | | | | 712/218 |
| 2005/0055490 | A1* | 3/2005 | Widell | G06F 9/3851 |
| | | | | 711/1 |
| 2008/0307173 | A1* | 12/2008 | Yeh | G06F 12/0607 |
| | | | | 711/157 |
| 2009/0210675 | A1* | 8/2009 | Alexander | G06F 9/3016 |
| | | | | 712/216 |
| 2009/0210679 | A1* | 8/2009 | Tsai | G06F 9/3834 |
| | | | | 712/225 |
| 2010/0293344 | A1* | 11/2010 | Nishino | G11C 15/00 |
| | | | | 711/154 |
| 2010/0306507 | A1* | 12/2010 | Day | G06F 9/3834 |
| | | | | 712/216 |
| 2013/0339670 | A1* | 12/2013 | Busaba | G06F 9/30043 |
| | | | | 712/216 |
| 2013/0339671 | A1* | 12/2013 | Williams, III | G06F 9/30043 |
| | | | | 712/217 |
| 2014/0380022 | A1* | 12/2014 | Troester | G06F 9/3826 |
| | | | | 712/216 |

* cited by examiner

COMPARING LOAD INSTRUCTION ADDRESS FIELDS TO STORE INSTRUCTION ADDRESS FIELDS IN A TABLE TO DELAY ISSUING DEPENDENT LOAD INSTRUCTIONS

BACKGROUND

The present disclosure relates to improving computer system efficiency, and more particularly to the reduction of operand store compare penalties through instruction text based early detection.

As computer system designers seek to continually improve processor performance, it is beneficial to develop approaches that reduce cycles per instruction (CPI). Operand store compare (OSC) penalties can be a large contributor to high CPI numbers. OSC is defined as encountering an instruction with an operand to store data to memory followed by an instruction to load the data from the memory before the stored data actually reaches the memory. As a stream of instructions progresses through a processor pipeline, various control units perform tasks such as fetching instructions, dispatching instructions, calculating address values, accessing registers, fetching operands, executing instructions, checking for error conditions, and retiring the instructions including storing the results. When instructions advance deeper through the pipeline, dependency conditions, errors, incorrectly predicted branches, and the like, can stall the progress of the instructions through the pipeline as the conditions are handled.

SUMMARY

According to an embodiment of the present invention, a computer-implemented method for marking load and store instruction overlap in a processor pipeline is described. The method includes detecting a load instruction following a store instruction in an instruction stream. The load instruction and the store instruction include instruction text. The instruction text includes operand address information. The method includes comparing operand address information of the store instruction with operand address information of the load instruction to determine whether there is a memory image overlap in an issue queue between the operand address information of the store instruction and the load instruction. The method also includes delaying the load instruction in the processor pipeline in response to determining that there is a memory image overlap.

According to other embodiments, a system for marking load and store instruction overlap in a processor pipeline is described. The system includes a processor pipeline for processing instruction text in an instruction stream. The instruction text in the instruction stream includes operand address information. The system further includes delay logic to monitor the instruction stream. The delay logic is configured to detect a load instruction following a store instruction in an instruction stream. The load instruction and the store instruction include instruction text. The instruction text includes operand address information. The delay logic is further configured to compare operand address information of the store instruction with operand address information of the load instruction to determine whether there is a memory image overlap in an issue queue between the operand address information of the store instruction and the load instruction. The delay logic is also configured to delay the load instruction in the processor pipeline in response to determining that there is a memory image overlap.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

When instructions advance deeper through the pipeline, dependency conditions, errors, incorrectly predicted branches, and the like, can stall the progress of the instructions through the pipeline as the conditions are handled. One problem with OSC is that occurrence of the condition is unknown until a cache address is formed, which may be after the instruction has already been issued, requiring costly stall/reset mechanisms. For instance, when load store (LS) logic detects an OSC, it then rejects/recycles the load instruction and holds it from issuing again until the storage data reaches a point where it can be bypassed (or read) by the load instruction. The penalty of such a reject can be many cycles of unused processing time. Compilers that generate the instructions typically try to distance instructions that store and load the same data sufficiently to minimize the OSC penalty. However, if the distance between the store and load is not large enough, the load can still be penalized in the processor pipeline. The distance between two instructions is defined by the number of cycles between dispatches of the two instructions. The distance is zero if the store and load are grouped and dispatched together, for instance, in a superscalar architecture. Although two instructions may be dispatched together, they may not necessarily issue together in the processor. In many aspects, issue distance is of particular interest, since the instructions may not incur any penalty until after they are issued.

In any modern, out of order microprocessor, it is necessary to closely track dependencies between instructions in order to both prevent an older instruction from corrupting a younger instruction's data, and ensure that the data a younger instruction is processing is up to date. Such dependency tracking can be done at or near dispatch time based on instruction text when it comes to register dependencies. If instruction X is going to write to register 0 and instruction X+2 is going to read register 0, a dependency can be created such that instruction X will execute prior to instruction X+2, allowing the instruction to use current data.

While register dependencies can be accurately extracted from instruction text and avoided, storage dependencies are not as straight forward. The storage addresses themselves do not exist in the instruction text. Rather, information from the instruction text is used to generate a storage address at execution time. Collisions between an older instruction storing to memory and a younger instruction reading from that same memory must be avoided as efficiently as possible, otherwise a performance penalty is incurred. This penalty manifests in two different ways: a Load Hit Store (LHS) collision and a Store Hit Load (SHL) collision.

In the case of an LHS collision, a younger load is issued after an older store, but not late enough to have that storage data forwarded to the load instruction. The operand store compare (OSC) event is detected on the load, causing the execution unit to reject the load instruction and issue it again later, thus wasting execution resources.

In the case of an SHL collision, a younger load is issued before an older store (because the address generation has not yet occurred, so the dependency is unknown). The OSC event is detected on the store, and since the load is past the point of reject, it must be flushed and dispatched again, wasting not just execution resources but pre-execution resources at the front of the pipeline as well. This is a more significant penalty than incurred on a LHS, since flush goes back further than dispatch. Thus, the instruction frequently may need to be refetched.

Methods exist in order to avoid such collisions. Dynamic OSC (DOSC) prediction is one method. Instructions identified at execution time as OSC culprits (the store) and victims (the load) are tracked, and when the instruction is encountered again, an appropriate dependency can be identified and added to the instruction dependency matrix.

Static OSC (SOSC) prediction is another method. The following describes a method for marking such SOSC dependencies at dispatch time based on instruction text.

To address these problems described above, it may be advantageous to provide a method where dispatched stores are tracked at the front end of the pipeline (the Dispatched Store Table, or DST). Upon encountering a load, a base/index/displacement (B/X/D) comparison can be performed with all valid entries of the table. If a hit is detected, the system can set an instruction dependency matrix (referred to herein as a "scoreboarding bit") based on the position of the store in the issue queue (QPOS). If there are multiple hits, the system may report the youngest QPOS. In other aspects, it may be advantageous to include entry invalidation based on register writes and a range compare (as opposed to a start address compare in previous machines) in order to make the reported dependencies more accurate.

As a background introduction, a system for early instruction text based operand store compare (OSC) reject avoidance is described with respect to FIGS. 1-4. FIGS. 5-9 describe reduction of operand store compare rejects penalties through instruction text based early detection, according to some embodiments of the present invention.

By way of a background for the present invention, an OSC condition can occur when one instruction in a processor pipeline includes an operand targeted to store data to memory, and a second instruction attempts to load the data from the memory before the store completes. In an exemplary embodiment, instruction text in an instruction stream is accessed to detect potential OSC conditions early in a processor pipeline. Early detection is performed prior to address generation to minimize wasted time in recycling an instruction that has progressed deep into the processor pipeline. This is achieved by taking advantage of instruction formatting that is common across multiple instructions. For example, comparing bits from instruction text that provide operand address information, such as index, base, and displacement fields, provides information to determine if an OSC is likely to occur in the instruction stream.

Figure 1:
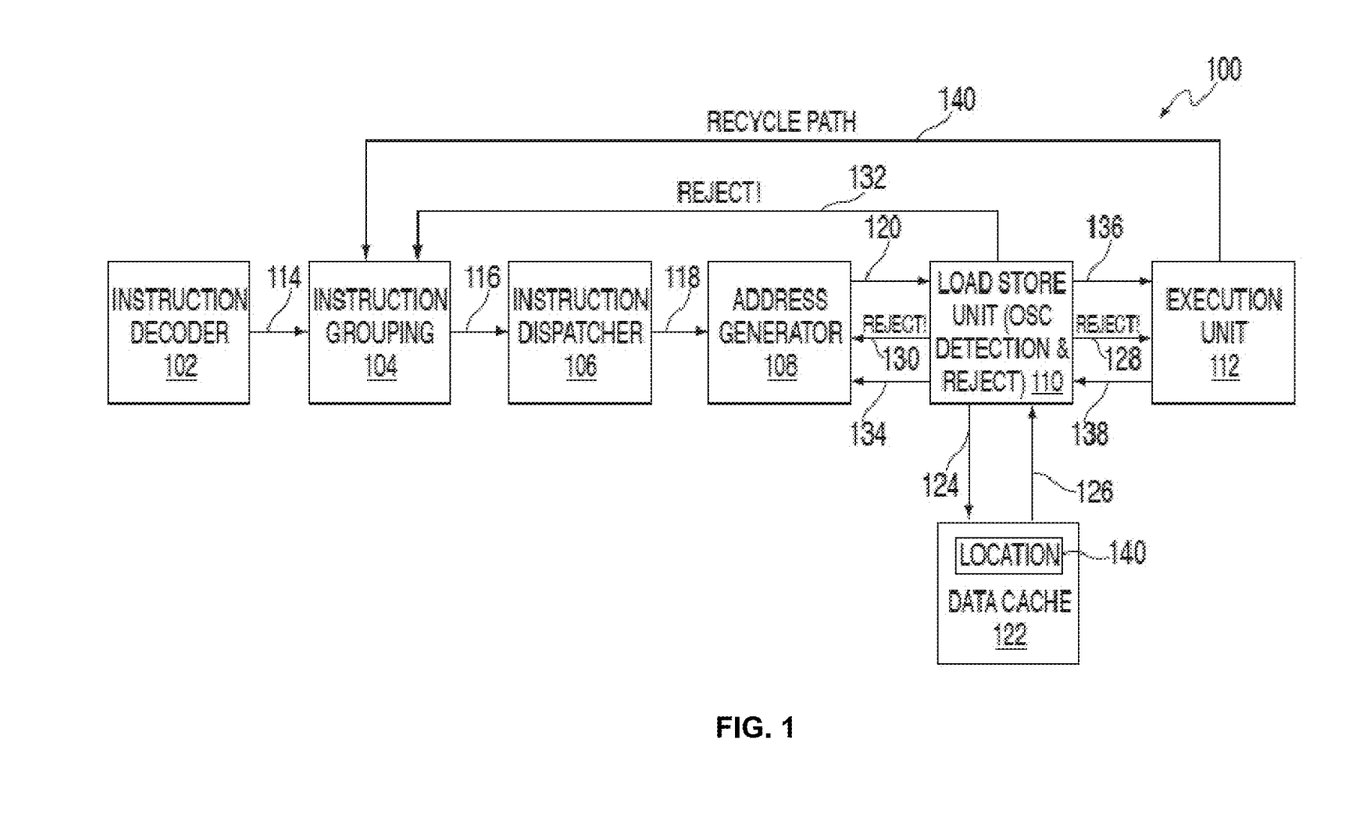
FIG. 1 depicts a block diagram of a system for early instruction text based operand store compare avoidance.

Turning now to FIG. 1, a system 100 is depicted that includes multiple functional units to support pipelining of instructions in processing circuitry. Pipelining can increase instruction execution throughput by performing stages such as fetching, decoding, execution and completion concurrently for multiple instructions in an instruction stream. In an exemplary embodiment, functional units in the system 100 include: instruction decoder 102, instruction grouping 104, instruction dispatcher 106, address generator 108, load store unit 110, and execution unit 112. It will be understood that additional functional units can be included in the system 100 which are not depicted, such as an instruction fetching unit, a completion unit, a recovery unit, and the like.

Multiple communication paths can be used to communicate between each of the functional units 102-112. The communication paths may vary in bus width (single-bit to multi-bit) and can be unidirectional or bidirectional. For example, path 114 passes instruction text (itext) in an instruction stream from the instruction decoder 102 to instruction grouping 104. The instruction grouping 104 determines whether instructions can be grouped together for parallel processing, for example, using a super-scalar architecture. The instruction grouping 104 can create itext based OSC dependencies on older store instructions that have progressed into later pipeline stages (e.g., in functional units 106-112). The instruction grouping 104 passes itext including any groups formed via path 116 to instruction dispatcher 106. The instruction dispatcher 106 delays dispatching of a load instruction when a store instruction with a potential OSC condition has been identified. The instruction dispatcher 106 dispatches itext, maintaining dependencies via path 118 to address generator 108. The address generator 108 determines actual address values, which may be calculated using a combination of base, index, and displacement fields from itext in the instruction stream. The address generator 108 sends itext with operand address information to the load store unit 110 via path 120.

The load store unit 110 can access a data cache 122 via path 124 and receives data from the data cache 122 via path 126. The load store unit 110 performs actual OSC detection, monitoring actual load and store accesses to the data cache 122. When the load store unit 110 detects that an operand load has been requested for a location 140 in the data cache 122 that has not completed a store operation, the load store unit 110 declares a reject condition for the associated instruction, since it cannot complete. The reject condition is forwarded to execution unit 112 via path 128 and returned to address generator 108 via path 130 and to instruction grouping 104 via path 132. Additionally, the load store unit 110 can feed information back to the address generator 108 via path 134, and forward information to the execution unit 112 via path 136. The execution unit 112 can also send data to the load store unit 110 via path 138 and send itext back to the instruction grouping 104 via location 140. Although the paths 130 and 134, as well as paths 136 and 128, are depicted as separate paths, it will be understood that paths can be combined within the scope of the invention.

Figure 2:
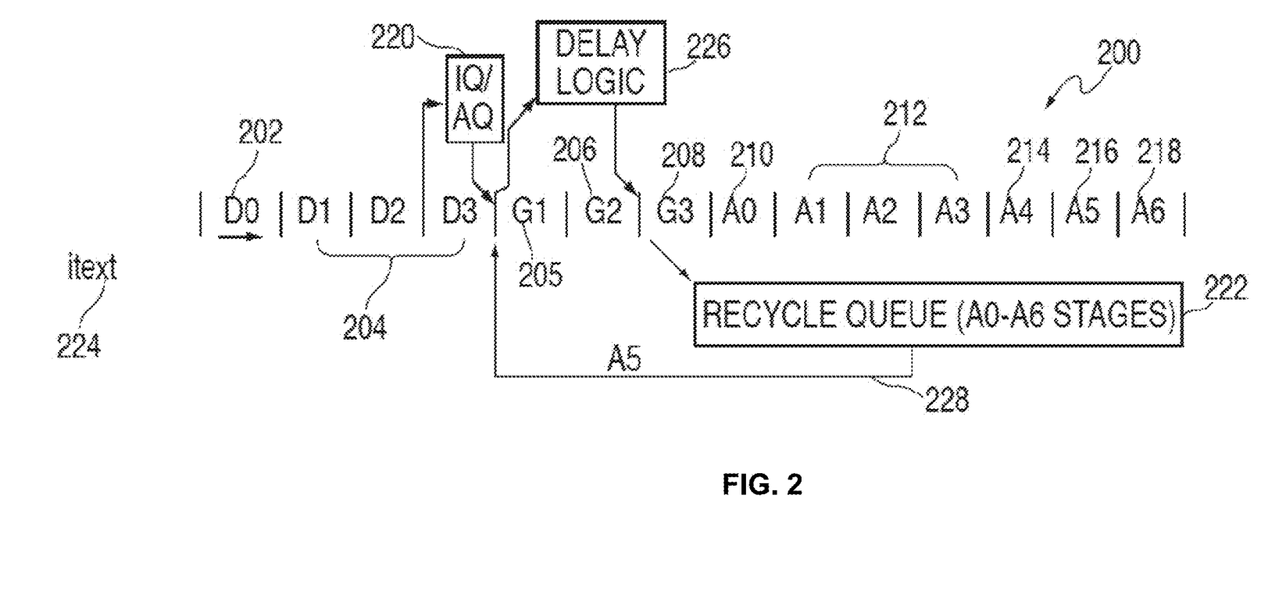
FIG. 2 depicts a block diagram of an instruction processor pipeline, delay logic and recycle queue.

Turning now to FIG. 2, a block diagram of an instruction stream in a processor pipeline 200 is depicted. Stages of the processor pipeline 200 include D0 202 to transfer fetched instructions for decoding, D1 through D3 204 to decode instructions (e.g., instruction decoder 102 of FIG. 1), G1 205 and G2 206 to group instructions (e.g., grouping stages in instruction grouping 104 of FIG. 1), G3 208 to dispatch instructions (e.g., instruction dispatcher 106 of FIG. 1), A0 210 to perform address generation (e.g., address generator 108 of FIG. 1), A1 through A3 212 for cache access (e.g., load store unit 110 of FIG. 1), A4 214 to execute instructions (e.g., execution unit 112 of FIG. 1), A5 216 to start the put away of results or recycle instructions on failure conditions, and A6 218 to retire instructions.

As instructions advance in decoding stages D1 through D3 204, an instruction queue and address queue (IQ/AQ) 220 may be used to expand itext 224 into greater levels of detail for processing. The expansion adds additional control and status information associated with the itext 224. Delay logic 226 monitors movement of the itext 224 into the G1 205 stage and identifies fields that may be used for operand address calculation. If a store instruction is identified, the delay logic 226 monitors for a subsequent load instruction with potential overlap in operand fields that include operand address information. When an overlap is detected, the delay logic can hold the load instruction for up to a designated number of cycles to provide adequate time for the Store instruction to at least be able to support forwarding to a dependent Load. Delaying the Load instruction proactively, rather than waiting for an actual non-forwardable OSC to be detected later in the pipeline once address generation is performed, prevents rejection of the load instruction. This Load to Store dependency tracking and stalling is applied for each Store in the window of influence. The delay logic 226 may be performed in instruction decoder 102, instruction grouping 104, or instruction dispatcher 106 in FIG. 1. The instruction queue and address queue (IQ/AQ) 220 can be used to store decoded instruction text if the grouping stages are blocked.

Recycle queue 222 retains instruction information for use in the cases where a retry of an instruction if necessary. Upon determining that there is a need to reject the dependent Load, the rejected instruction is returned to an earlier position in the processor pipeline 200 via recycle path 228. Actual OSC rejects due to OSC occurs in A5 216.

Figure 3:
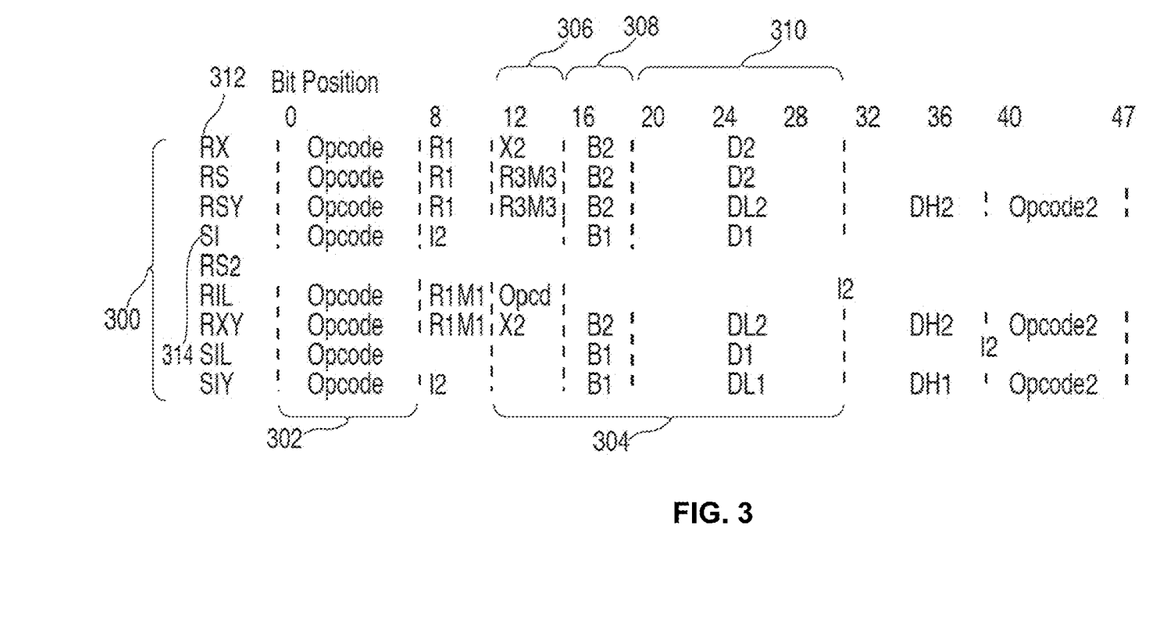
FIG. 3 depicts instruction formats.

Turning now to FIG. 3, instruction formats 300 are depicted. Each row in the instruction formats 300 includes instruction text (itext) formatting for a particular instruction format in the instruction formats 300. Fields are defined relative to bit positions. For example, bits positions 0 to 7 represent opcodes 302. Bit positions 12 through 31 can contain operand address information 304 that may also include other information depending upon each instruction format. The operand address information 304 may include operands for the opcodes 302, such as an index field 306, a base field 308, and/or a displacement field 310. The index field 306, base field 308, and/or displacement field 310 can be combined to form a value used to detect a potential OSC. The index and base fields, 306 and 308, represent the number of a General Purpose Register (GPR) to be utilized in Address generation. In cases where either field is not utilized by the instruction it is set to "0000". Each format in the instructions formats 300 may provide formatting for both load and store instructions. For example, the delay logic 226 of FIG. 2 can identify load and store instructions formatted in RX format 312 and directly compare the operand address information 304 associated with each instruction, a subset of fields (e.g., base fields 308) or a combination of fields to detect a potential OSC. The identification and comparison of operand address information 304 for load and store instructions can also be performed across formats, such as a load instruction in RX format 312 and a store instruction in SI 314 format. The delay logic 226 may perform conditional comparisons that target specific instruction formats 300 and perform comparisons when the instruction formats 300 include specific fields, e.g., index fields 306.

Figure 4:
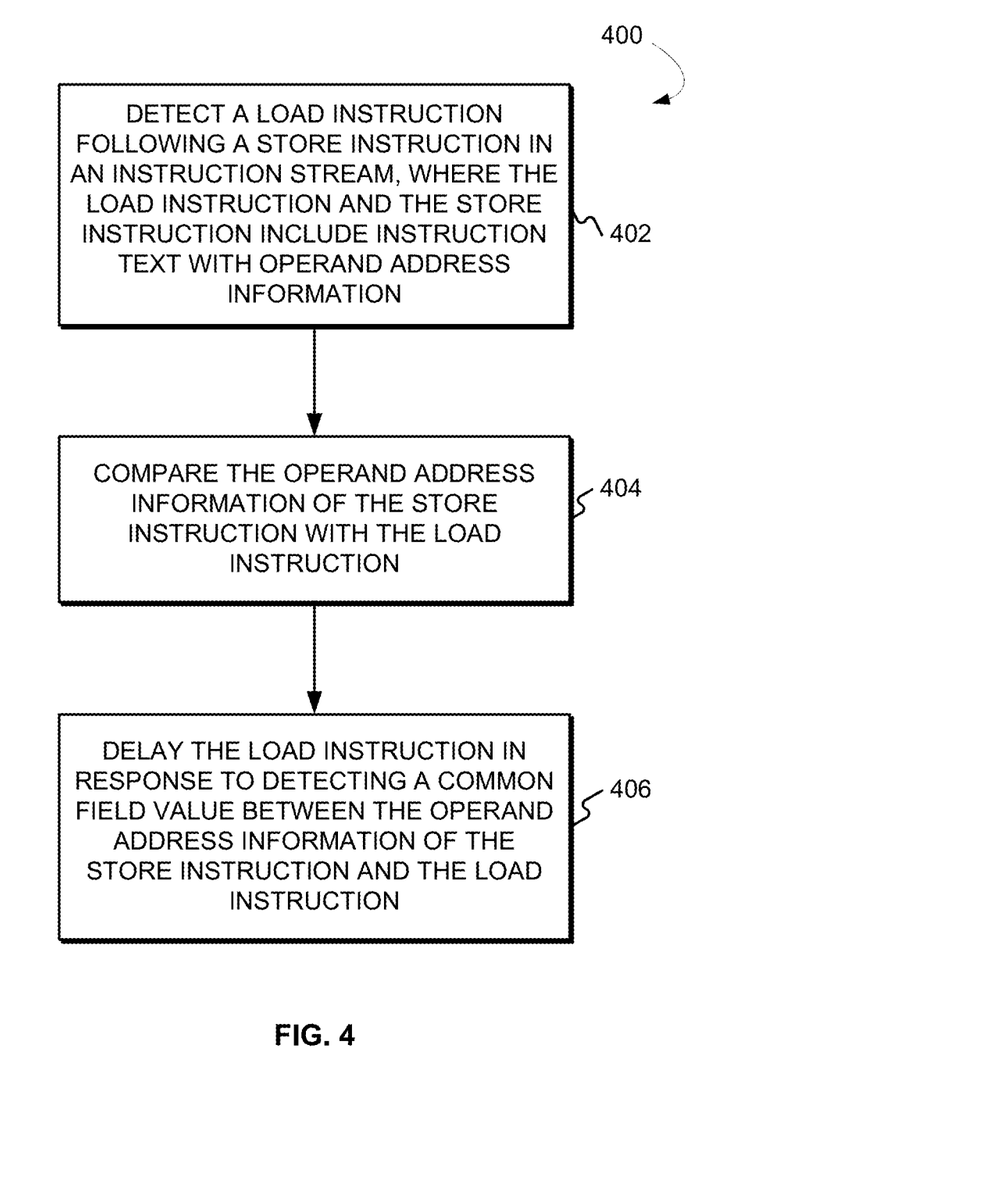
FIG. 4 depicts a process for early instruction text based operand store compare avoidance.

Turning now to FIG. 4, a process 400 for early instruction text based operand store compare avoidance will now be described in reference to FIGS. 1-3. At block 402, delay logic 226 detects a load instruction following a store instruction in an instruction stream. The load instruction and the store instruction include itext 224 with operand address information 304. For example, the delay logic 226 may be included in the instruction grouping 104.

At block 404, the delay logic 226 compares the operand address information of the store instruction with the load instruction. The compare can be performed across the entire displacement field 310 or a subset thereof. The compare may identify common fields between the load and store instructions for comparison. The delay logic 226 may also distinguish between instruction formats 300 such that non-existing fields or fields with alternate definitions are not compared to each other.

At block 406, the delay logic 226 delays the load instruction in the processor pipeline 200 in response to detecting a common field value between the operand address information 304 of the store instruction and the load instruction. For example, the base field 308 of the store instruction may target the same location 140 as operand address information 304 of the load instruction. In an exemplary embodiment, the delay of the load instruction is performed prior to dispatching the load instruction. In determining a number of cycles to delay the load instruction, the delay logic 226 can calculate the number of cycles between the load instruction and the store instruction, and establishes the delay period as a minimum value delay to avoid a reject minus the number of cycles between the load instruction and the store instruction. Identifying a potential OSC early in the processor pipeline 200 and delaying the load instruction prevents the longer delay associated with the recycle queue 222 that occurs when an actual non-forwardable OSC is allowed to occur. A pre-emptive delay for a potential OSC can prevent an actual, more costly OSC reject from occurring. Alternatively, in rare cases based on implementation, the pre-dispatch delay introduced by the itext based scheme may be unnecessary because an address generator (AGEN) shows that there is actually no overlap.

It will be understood that the process 400 can be applied to any processing circuitry that incorporates a processor pipeline. For example, process 400 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry.

Technical effects and benefits include early instruction text based operand store compare avoidance in a processor pipeline. In a normal compiled program, instructions writing and reading the same storage area generally utilize the same registers and displacement. Unlike other prediction schemes, additional loading or memory beyond that already included as part of a processor pipeline need not be used. Instead, readily available itext being staged in support of a general recycle scheme can be analyzed to act preemptively before an actual OSC occurs.

In another aspect of instruction text ("itext") analysis, the instruction delay logic may be configured to determine storage dependencies between loads and stores early in the pipeline to allow issuance without collisions. FIGS. 1-4 described a system for early itext based operand store compare (OSC) reject avoidance as a background introduction to embodiments of the present invention. FIGS. 5-9 describe a system having delay logic configured for reduction of OSC reject penalties through early detection, according to some embodiments of the present invention.

As a general overview, one or more embodiments of the present invention may look at several pieces of information from itext in the instruction pipeline. Generated addresses are made of a base register, an index register, a displacement value, a thread identification, a memory image and additional information providing more details about the store. Each time an instruction comes down the pipeline, it is checked to determine if it is a store or not. If it is, then the above information is written to the DST. That store information sits in the DST table until it is overwritten. Anytime a subsequent load comes down pipeline, the same information in the load is compared to the store information in all valid DST entries. The delay logic reports the overlap to the ISU if the load and store are using same registers, have a similar displacement, and their memory images overlap. Consequently, the ISU will hold off on issuing the overlapping load in the instruction pipeline until the previous store has been handled.

Figure 5:
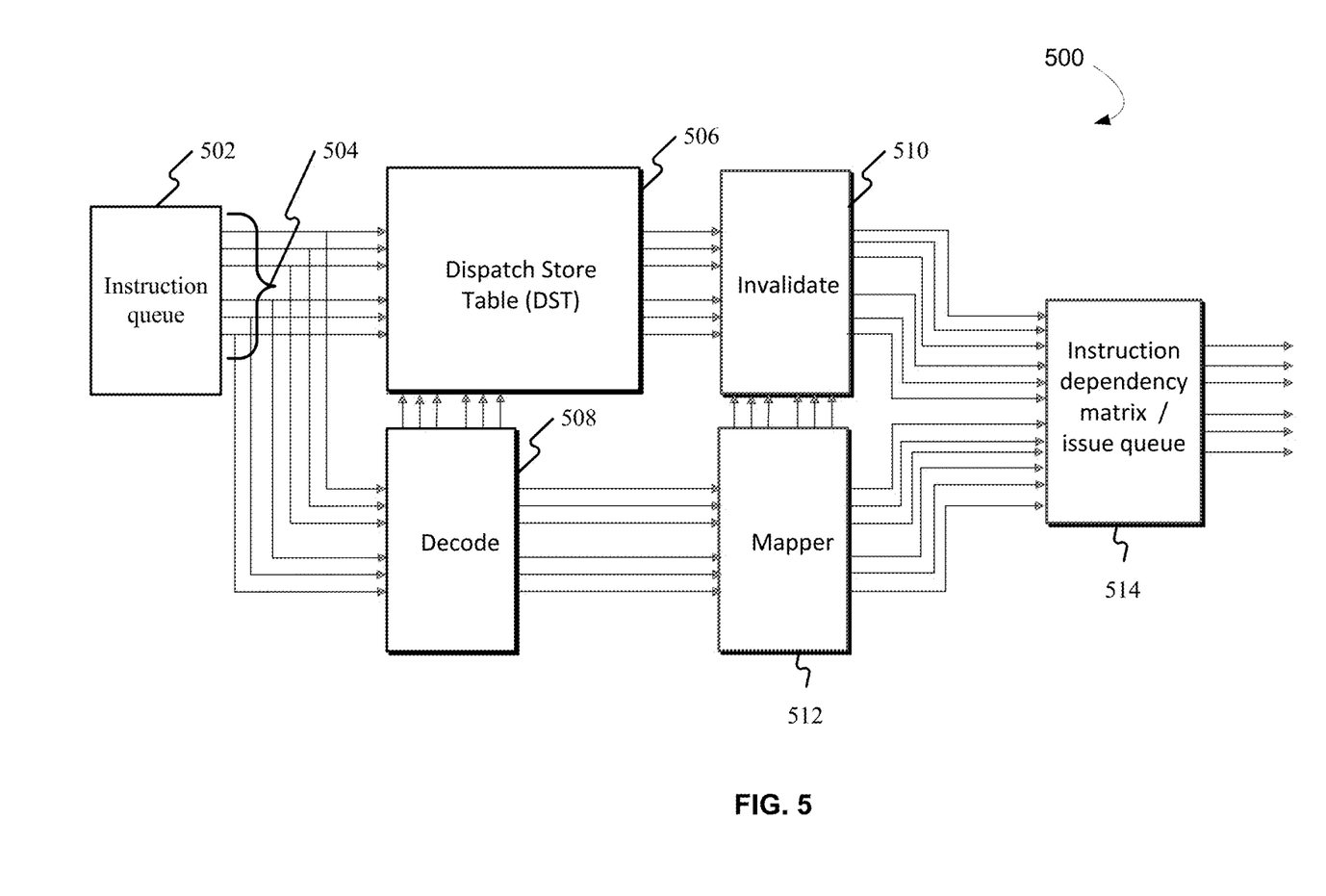
FIG. 5 depicts a block diagram of an instruction pipeline, according to one or more embodiments.

Now considering aspects of the present invention in greater detail, FIG. 5 depicts a block diagram of an instruction pipeline having delay logic 500, according to one or more embodiments. Delay logic 500 functions as an instruction dispatch unit (IDU) (which includes a dispatch store table 506 and a decode logic 508) and an instruction sequencing unit (ISU) (which includes invalidate logic 510 and a register mapper 512), according to one or more embodiments. The IDU and ISU maintain parallel tables: one table includes the base, index, displacement and the address vector. The parallel table is implemented as an instruction dependency matrix in instruction dependency matrix 514 that records the dependency information for each dependency identified by the IDU unit. In some aspects, the IDU dispatches in order, identifying SOSC dependencies as we dispatch, while the ISU issues out of order using the scoreboard (which includes the SOSC dependencies reported by the IDU).

Delay logic 500 can include a system instruction queue 502, a dispatch store table (DST) 506, decode logic 508 configured to decode grouped instructions, a register mapper 512, and invalidate logic 510. Delay logic 500 can also include an instruction dependency matrix/issue queue logic 514 (hereafter "instruction dependency matrix 514") configured to keep track of all of the dependencies in the issue queue including the present dependency.

In some aspects system instruction queue 502 provides grouped instructions to both DST 506 (described in greater detail with respect to FIG. 7) and decode logic 508. Decode logic 508 can evaluate the grouped instructions. Decode information is calculated and sent to DST 506 and simultaneously sent to register mapper 512. Decode information can include data such as, for example, whether the instruction is a load, whether the instruction is a store, etc. Using the decode information, DST 506 may determine whether it should be looking for a hit in the table, write an entry, or invalidate an entry from the table using the information received by decode logic 508.

After decode logic 508 determines that a load does have a dependency on a store in the DST, the dependency information is sent to invalidate logic 510 in the ISU. The DST logic on the IDU side is unable to invalidate a store who's base or index register has been written in the same cycle as the load. Register mapper calculates its own register dependency information (to avoid overwriting mapped, physical registers) that it subsequently forwards to the invalidate logic, since this same information is needed to determine if an SOSC hit should be honored. If DST 506 reports an overlap between load and a store in the DST, and during that same cycle, the base or index register that has been written by an older instruction, that dependency will be invalidated, and will not reach the instruction dependency matrix 514.

If the dependency information passes through invalidate logic 510 without being invalidated, then the present dependency information registers on instruction dependency matrix 514. Accordingly, instruction dependency matrix 514 keeps track of all dependencies in the issue queue including the present dependency. Once the dependency is resolved, then the instruction dependency matrix 514 knows it can issue this load.

Figure 6:
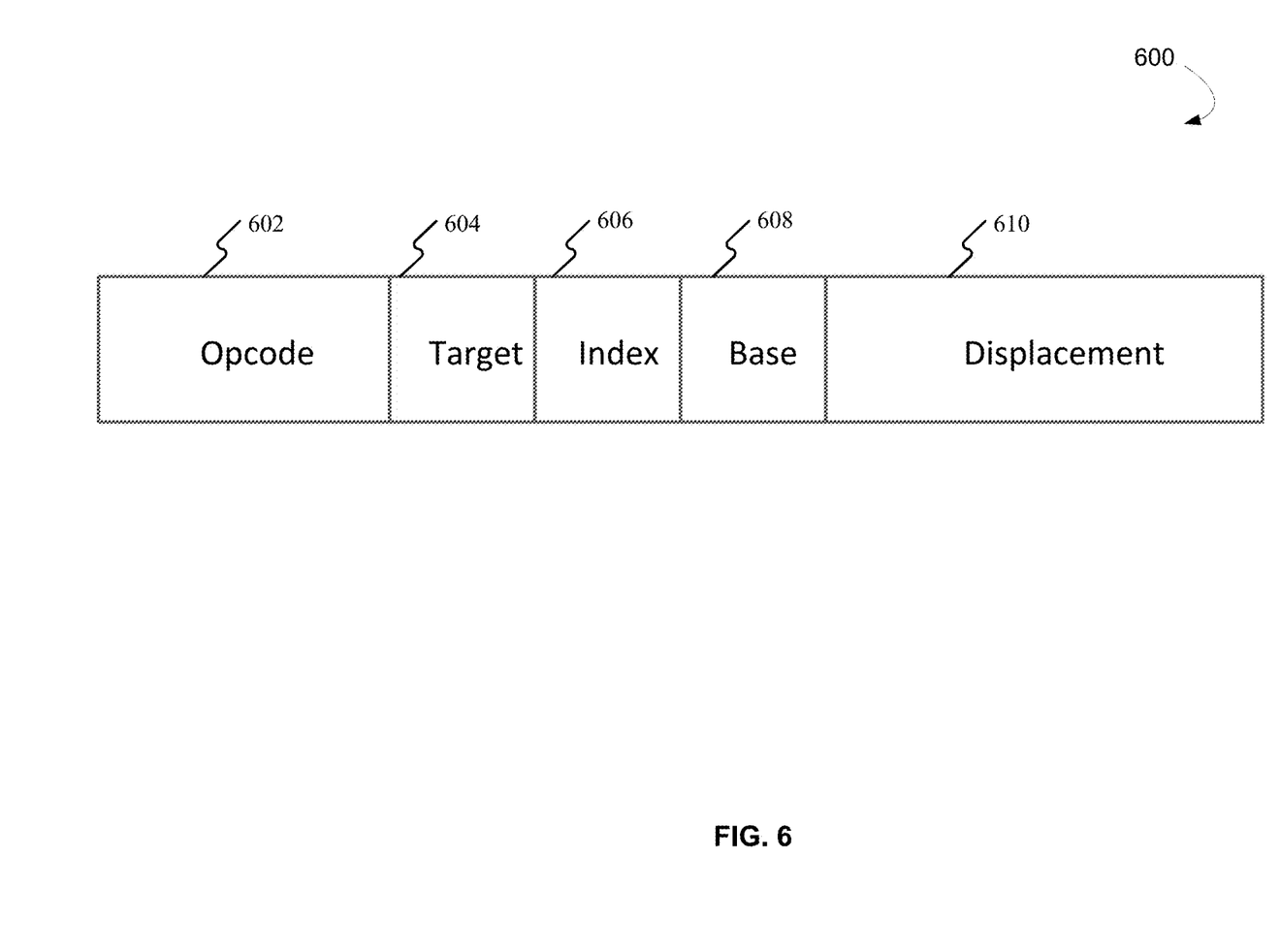
FIG. 6 depicts an instruction, according to one or more embodiments.

FIG. 6 depicts an instruction address 600, according to one or more embodiments. In some aspects, instruction address 600 includes an opcode 602, a base register 608, an index register 606, a displacement 610 and the target register 604.

Figure 7:
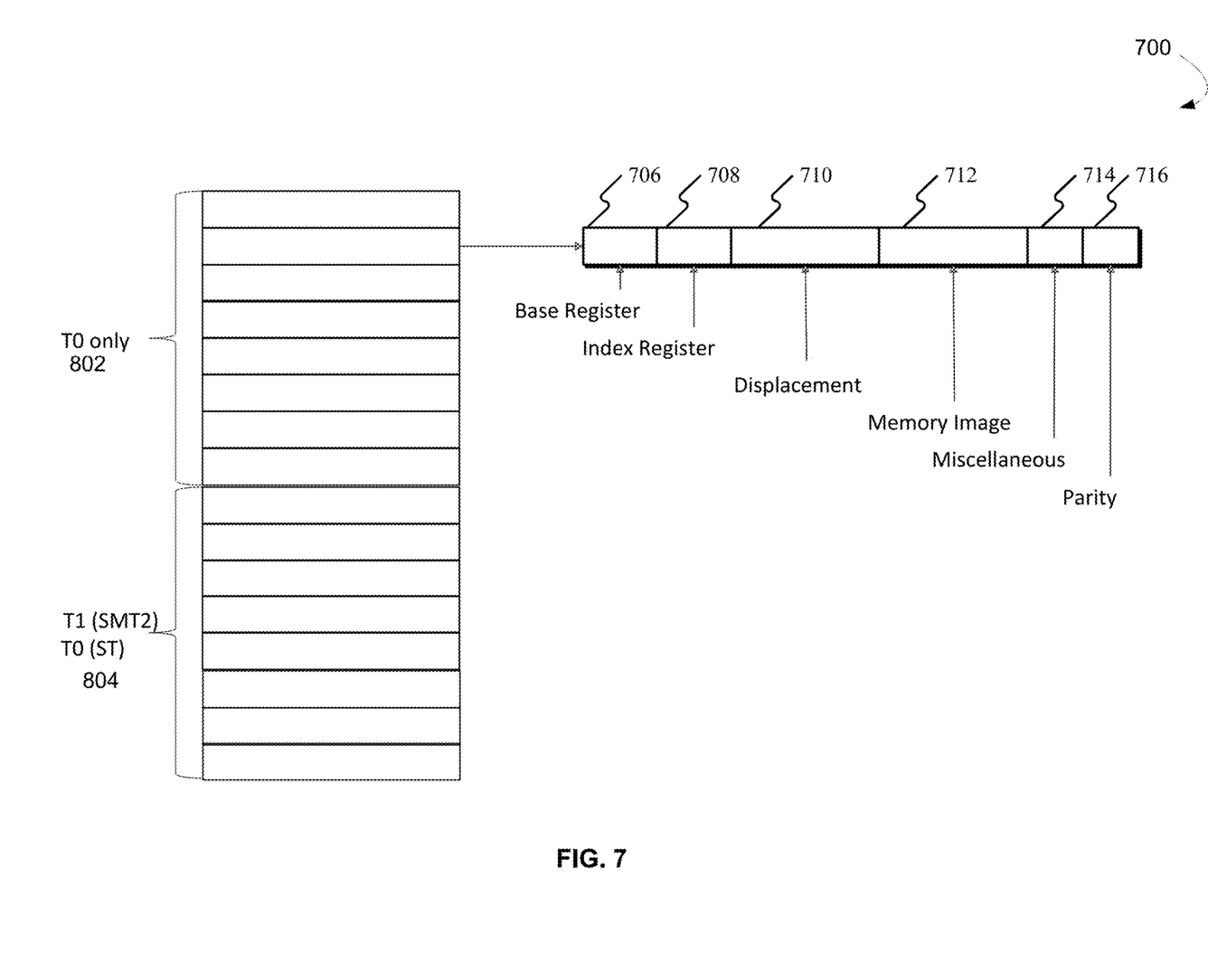
FIG. 7 depicts a DST structure, according to one or more embodiments.

FIG. 7 depicts a DST structure 700, according to one or more embodiments. DST structure 700 may be statically partitioned per thread. For example, in SMT2 (Simultaneous Multi-Threading) mode, each thread in DST structure 700 may use 8 entries, depicted as thread 804. In single thread mode, all 16 entries (both 802 and 804) are used for thread 0. Each entry includes a base register 706, an index register 708, a displacement 710, a memory image 712, miscellaneous bits 714, and parity bits 716. For address computation for locations in storage, the execution unit generates the starting address by taking a sum of the contents of the base register 706 plus the sum of contents of index register 708, plus displacement 710. The delay logic never knows the actual starting address, only where AGEN will get the information it needs to determine the starting address. The full address computation is not done until later in the pipeline (specifically, in the execution unit).

Figure 8:
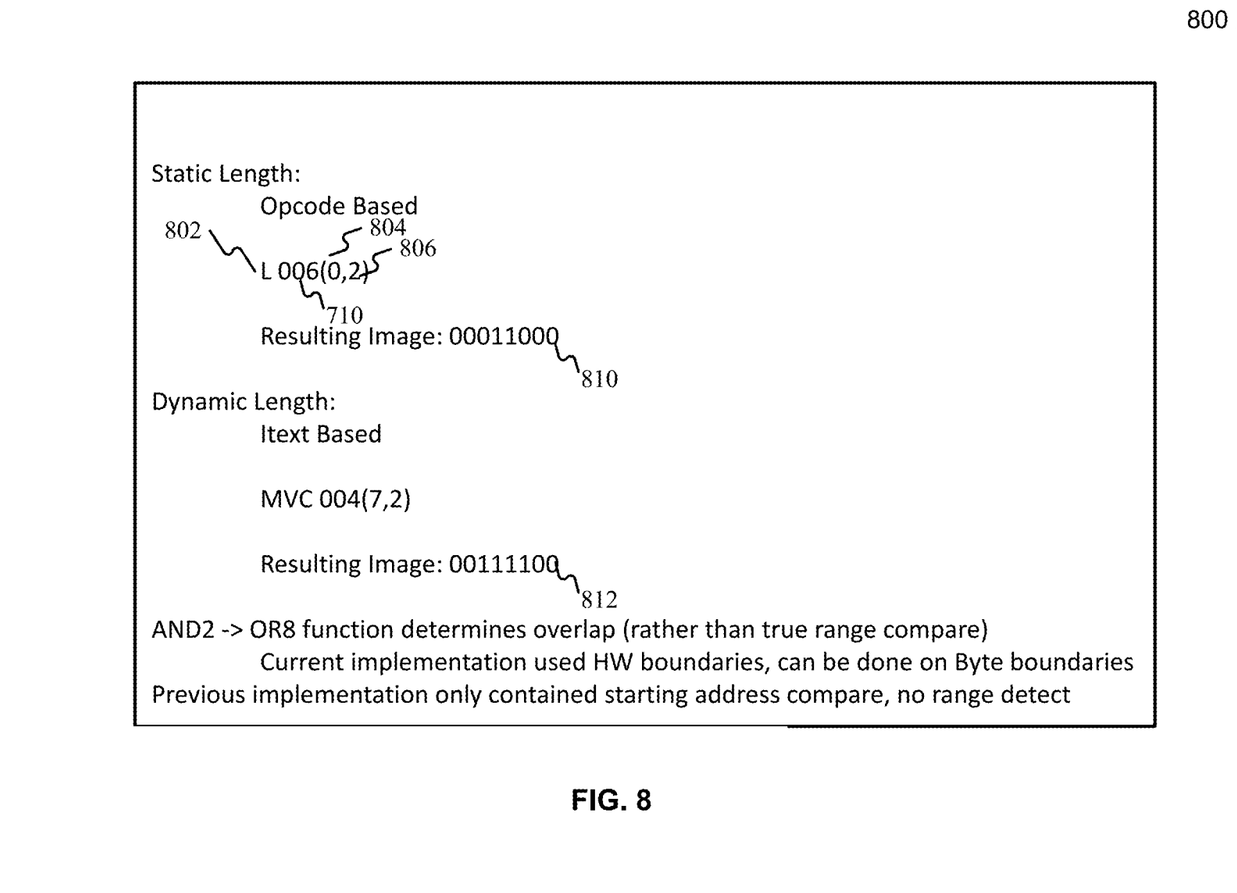
FIG. 8 depicts a memory image, according to one or more embodiments.

FIG. 8 depicts a memory image 800, according to one or more embodiments. Delay logic 500 uses memory image 800 to find any possible instruction overlap. The starting address is based on the base register 706, index register 708 and displacement 710, which are contained in itext. The instructions that operate on storage can have any length from a single byte to multiple bytes. Memory image 800 depicts information used to determine whether there is overlap between the instructions even if the starting addresses are not the same.

Some operations have a static length, such as a basic load which always writes 4 bytes of data. As shown in FIG. 8, load "L" is shown having a base of 0 and an index of 2, (804 and 806, respectively). Displacement 710 is shown as 006 in the example of FIG. 8. To calculate a starting address, the execution unit adds the contents of the base register and index register to displacement 710 which is a displacement of 6 in the present example.

In the example of FIG. 8, delay logic 800 implements memory image 800 on quad word boundaries with each bit representing a half word. Accordingly, for an embodiment using a quad word, there are 8 half words in the vector.

According to one or more embodiments, delay logic 500 determines the vector using the lower 4 bits of displacement 710 (shown as 006). In this embodiment, where each bit in the vector represents a half word, the last bit of the displacement is not needed for the vector determination. Accordingly, delay logic 500 drops the last bit of that 6, and only uses bits 8, 9, and 10, which in the present example are 011 binary (or a 3 in base 10) of displacement 710. So we start on bit 3 of our memory image. This load writes two half words worth of data, so from bit 3 delay logic 500 drives two bits to 1's. The resulting memory image 810 is 00011000.

There may also be instances of operations that are not static that have dynamic lengths, but many of those can be determined from the itext. Consider a move character (MVC) function. This function has a base of 2 and a displacement of 4. The load 0 represents an index register, and the 7 represents the length of the operation. Based on this itext, delay logic 500 performs the same operation as done with the load. Delay logic 500 can identify bits 8 to 10 of the displacement, which in the present example are a 2. Delay logic 500 identifies bit 2 of our memory image, and makes that location the starting point to drive 1s on the memory image. The number of 1s to write to memory is based on the length of the operation. Here the length is 7, which is 8 bytes worth of data (4 half words). Accordingly, delay logic 500 drives is on the next 4 bits of this memory image, which results in resulting image 812 (00111100). If the load in the present example had followed this MVC, we would see that the base matches, the load didn't use an index (which is a match as well), and bits 0 through 7 of the displacement also match.

Now delay logic 500 may compare the memory images, according to one or more embodiments. Delay logic 500 may query vectors 810 and 812 and cause memory image 800 to perform a bitwise AND operation. In the present example, this operation gives a result of 00011000 (same as the load image). This means that there is overlap between this MVC and this load where the system is storing and loading from. Delay logic 500 may then perform a bitwise OR operation on all bits of resulting vector, and if the result of the OR operation is a 1, delay logic 500 determines that there was overlap. Any instance of an overlap (determined by the base/index/displacement compare and memory image check) between these two instructions is reported to instruction dependency matrix 514.

It should be appreciated that, although embodiments of the memory image are described using a quad word of memory with half-word granularity, those skilled in the art appreciate that each vector/bit may represent any amount of memory.

Figure 9:
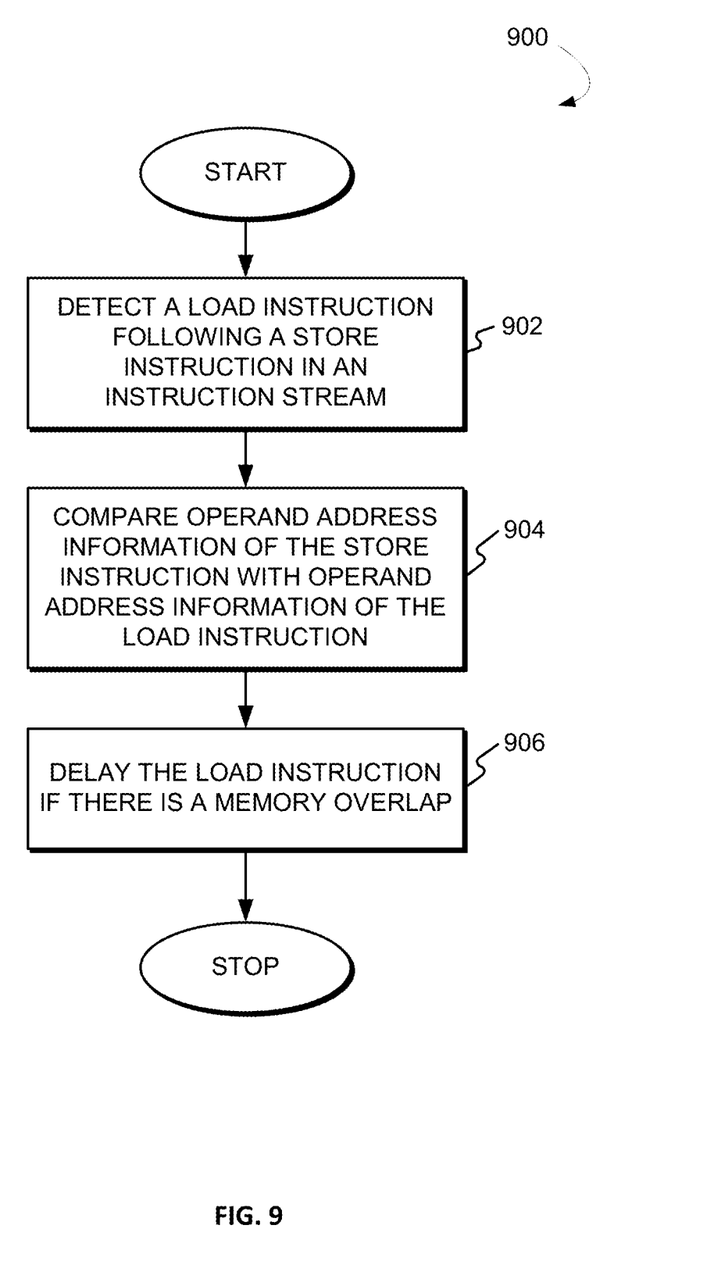
FIG. 9 depicts a method for marking load and store instruction overlap in a processor pipeline, according to one or more embodiments.

FIG. 9 depicts a method 900 for marking load and store instruction overlap in a processor pipeline, according to one or more embodiments. Referring now to FIG. 9, at block 902 delay logic 500 may detect a load instruction following a store instruction in an instruction stream, wherein the load instruction and the store instruction include instruction text. The instruction text includes operand address information.

Upon encountering a load, delay logic 500 may perform a base/index/displacement (B/X/D) comparison with all known older valid store instructions. As shown in block 904, delay logic 500 may compare operand address information of the store instruction with operand address information of the load instruction to determine whether there is a memory overlap in an issue queue between the operand address information of the store instruction and the load instruction.

Comparing operand address information can include identifying a vector of the memory image. Accordingly, delay logic 500 may determine a displacement of the load instruction and a length of the load instruction. Delay logic 500 may next identify a store vector of the memory image by determining a displacement of the store instruction and a length of the store instruction. Finally, delay logic may compare this operand address information of the load and store instructions.

According to one or more embodiments, evaluating the load vector and the store vector can include performing a bitwise AND operation on the load vector and the store vector. Delay logic 500 may perform a bitwise OR operation on a result of the bitwise AND operation, and determine that there is a memory image overlap between the operand address information of the store instruction and the load instruction responsive to determining that any resultant bits of the bitwise OR operation are 1.

If a hit (a memory overlap) is detected, the delay logic 500 can set a scoreboarding bit (not shown) on the overlapping instruction based on the position of the store in the issue queue (QPOS). If there are multiple hits, delay logic 500 may report based on predetermined criteria. For example, according to one embodiment, delay logic 500 may report the youngest QPOS. In another embodiment, delay logic 500 may report the oldest QPOS. In yet other embodiments, delay logic 500 may choose a random QPOS.

As shown in block 906, delay logic 500 may delay the load instruction in the processor pipeline in response to determining that there is a memory image overlap.

In one or more embodiments, delay logic 500 may identify a write to a register, and invalidate the store instruction responsive to determining that the register is used to determine the operand address of the store instruction. Delay logic 500 may also update instruction dependency matrix 514 with information indicative of a dependency in an issue queue. In one or more embodiments, delay logic 500 may dynamically calculate a number of cycles between the load instruction and the store instruction, and establish a delay period via the instruction dependency matrix 514 for delaying the load instruction. In one or more embodiments, the delaying is performed prior to the load instruction reaching a recycle queue capable of returning the instruction to an earlier stage in the processor pipeline. Once delay logic 500 determines that all dependencies on a given load are satisfied, the load is allowed to issue. That could take any number of cycles.

Aspects of the present invention may improve computing system performance as a stream of instructions progresses through a processor pipeline by monitoring dependency conditions and errors, and delaying overlapping instructions to correct overlap errors. By delaying the load instructions for a predetermined delay period, system errors and crashes can be avoided.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for marking load and store instruction overlap in a processor pipeline comprising:
    detecting a load instruction following a store instruction in an instruction stream, wherein the load instruction and the store instruction comprise instruction text, the instruction text comprising operand address information;
    comparing operand address information of the store instruction with operand address information of the load instruction to determine whether there is a memory image overlap in an issue queue between the operand address information of the store instruction and the load instruction;
    delaying the load instruction in the processor pipeline by a delay period in response to determining that there is a memory image overlap, wherein the delaying is performed prior to the load instruction reaching a recycle queue capable of returning instruction text to an earlier stage in the processor pipeline;
    calculating a number of cycles between the load instruction and the store instruction and establishing the delay period as a minimum value delay to avoid a reject minus a number of cycles between the load instruction and the store instruction;
    determining whether the load instruction has a dependency on the store instruction;
    determining whether a base register or index register has been written by an older instruction during a same cycle as the load instruction; and
    responsive to determining that the load instruction has a dependency on the store instruction and responsive to determining that the base register or index register has been written by the older instruction during the same cycle as the load instruction, invalidating the dependency between the load instruction and the store instruction.

2. The computer-implemented method of claim 1, wherein the determination of the memory image overlap in the issue queue can be made with either identical starting addresses for the operand address information of the store instruction and the load instruction or dissimilar starting addresses for the operand address information of the store instruction and the load instruction.

3. A system for marking load and store instruction overlap in a processor pipeline comprising:
    a processor pipeline for processing an instruction text in an instruction stream, wherein the instruction text in the instruction stream comprises operand address information; and
    delay logic to monitor the instruction stream configured to:
        detect a load instruction following a store instruction in an instruction stream, wherein the load instruction and the store instruction comprise instruction text, the instruction text comprising operand address information;
        compare operand address information of the store instruction with operand address information of the load instruction to determine whether there is a memory image overlap in an issue queue between the operand address information of the store instruction and the load instruction;
        delay the load instruction in the processor pipeline by a delay period in response to determining that there is a memory image overlap, wherein the delay logic is configured to perform the delay prior to the load instruction reaching a recycle queue capable of returning instruction text to an earlier stage in the processor pipeline; and
        calculate a number of cycles between the load instruction and the store instruction and establish the delay period as a minimum value delay to avoid a reject minus a number of cycles between the load instruction and the store instruction; and
    invalidate logic configured to:
        determine whether the load instruction has a dependency on the store instruction;
        determine whether a base register or index register has been written by an older instruction during a same cycle as the load instruction; and responsive to determining that the load instruction has a dependency on the store instruction and responsive to determining that the base register or index register has been written by the older instruction during the same cycle as the load instruction, invalidating the dependency between the load instruction and the store instruction.

4. The system of claim 3, wherein the delay logic is configured to determine the memory image overlap in the issue queue with either identical starting addresses for the operand address information of the store instruction and the load instruction or dissimilar starting addresses for the operand address information of the store instruction and the load instruction.

* * * * *